(12) United States Patent
Kale et al.

(10) Patent No.: US 11,483,308 B2
(45) Date of Patent: Oct. 25, 2022

(54) SYSTEM, METHOD, AND APPARATUS FOR AGGREGATED AUTHENTICATION

(71) Applicant: Visa International Service Association, San Francisco, CA (US)

(72) Inventors: Aditya Ashok Kale, Buldhana (IN); Rohit Sukhija, Whitefield (IN); Mohan Babu Nellore, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 909 days.

(21) Appl. No.: 16/018,363

(22) Filed: Jun. 26, 2018

(65) Prior Publication Data

US 2019/0394192 A1    Dec. 26, 2019

(51) Int. Cl.
*G06Q 20/40* (2012.01)
*G06Q 20/38* (2012.01)
*H04L 9/40* (2022.01)

(52) U.S. Cl.
CPC ....... *H04L 63/0853* (2013.01); *G06Q 20/382* (2013.01); *G06Q 20/409* (2013.01); *G06Q 20/4018* (2013.01)

(58) Field of Classification Search
CPC .............. H04L 63/0853; G06Q 20/382; G06Q 20/4018; G06Q 20/409
USPC ........................................................ 705/64
See application file for complete search history.

(56) References Cited

U.S. PATENT DOCUMENTS

| | | | |
|---|---|---|---|
| 8,751,387 B2 | 6/2014 | Hougland et al. | |
| 2004/0024698 A1 | 2/2004 | Hines et al. | |
| 2010/0243728 A1 | 9/2010 | Wiesman et al. | |
| 2012/0041881 A1 | 2/2012 | Basu et al. | |
| 2013/0073464 A1 | 3/2013 | Magpayo et al. | |
| 2014/0279474 A1* | 9/2014 | Evans ................... | G06Q 20/40 705/41 |

(Continued)

FOREIGN PATENT DOCUMENTS

WO    2016081397 A1    5/2016

OTHER PUBLICATIONS

"Introducing Adaptive Payments", https://developer.paypal.com/docs/classic/adaptive-payments/integration-guide/APIntro/, 2018, 62 pgs.

(Continued)

*Primary Examiner* — Patrick McAtee
*Assistant Examiner* — Zesheng Xiao
(74) *Attorney, Agent, or Firm* — The Webb Law Firm (57) ABSTRACT

Provided is a system, method, and apparatus for aggregated authentication in an online, open loop payment network. The method includes receiving a single authentication request message to conduct a plurality of transactions with a plurality of merchants, the single authentication request message comprising an aggregation identifier, detecting the aggregation identifier in the single authentication request message, in response to detecting the aggregation identifier, generating a single authentication response message comprising a plurality of authentication codes, each authentication code of the plurality of authentication codes corresponding to a merchant of the plurality of merchants, and communicating the single authentication response message to the merchant system, the single authentication response message configured to cause the merchant system to separately process each transaction of the plurality of transactions.

17 Claims, 7 Drawing Sheets

(56) References Cited

U.S. PATENT DOCUMENTS

| | | | |
|---|---|---|---|
| 2016/0012398 A1* | 1/2016 | Dantu | G06Q 50/01 705/44 |
| 2019/0066099 A1* | 2/2019 | Kurian | G06Q 20/401 |
| 2019/0108515 A1* | 4/2019 | Lakka | G06Q 20/04 |

* cited by examiner

```
<PRReq>
    <cardhlder>
        <cardNumber></cardnumber>
        <expiryDate></expiryDate>
        .
        ... other cardholder related information ...
        .
    </cardholder>
    <transactionGroupID></transactionGroupID>
    <transactions>

<transaction>
            <id></id>
            <merchant>
                <acquiringBin></acquiringbin>
                <merchantID>merchant1<merchantID>
                .
                ... other merchant related information ...
                .
            </merchant>
            <purchase>
                <amount></amount>
                <currency></currency>
            </purchase>
        </transaction>

<transaction>
            <id></id>
            <merchant>
                <acquiringBin></acquiringbin>
                <merchantID>merchant2<merchantID>
                .
                ... other merchant related information ...
                .
            </merchant>
            <purchase>
                <amount></amount>
                <currency></currency>
            </purchase>
        </transaction>

</transactions>
</PQReq>
```

FIG. 6A

```
<PARes>
    <transactionGruopID></transactionGruopID>
    <transactions>

<transaction>
            <id></id>
            <cavv></cavv>
            <eci></eci>
        </transaction>

<transaction>
            <id></id>
            <cavv></cavv>
            <eci></eci>
        </transaction>

</transactions>
</PARes>
```

SYSTEM, METHOD, AND APPARATUS FOR AGGREGATED AUTHENTICATION

BACKGROUND OF THE INVENTION

1. Field of the Invention

This invention relates generally to authentication and, in one particular embodiment, to a system, method, and apparatus for aggregated authentication in an online, open loop payment network.

2. Technical Considerations

In some jurisdictions, regulatory authorities require Internet-based payments to comply with certain authentication protocols, such as the 3-D Secure ("3DS") protocol, to provide an additional layer of security. For a user that wishes to transact with multiple merchants, the user must separately authenticate transactions for each individual merchant. Separately authenticating each and every transaction takes additional time and computing resources, such as network bandwidth, memory, and computational power.

Using existing protocols and systems, an entity that wishes to facilitate marketplace payments from a single user or entity to multiple recipients without requiring multiple authentications would require cascading changes to the systems and arrangements of issuer institutions, acquirer institutions, transaction service providers, payment gateways, and/or the like.

SUMMARY OF THE INVENTION

According to a non-limiting embodiment, provided is a computer-implemented method for aggregated authentication in an online, open loop payment network comprising an issuer authentication system, a merchant system, a client device, and a transaction service provider system, including: receiving, by the issuer authentication system from the merchant system, a single authentication request message to conduct a plurality of transactions with a plurality of merchants, the single authentication request message comprising an aggregation identifier, a plurality of merchant identifiers, and transaction data for each transaction of the plurality of transactions; detecting, by the issuer authentication system, the aggregation identifier in the single authentication request message; in response to detecting the aggregation identifier, generating, by the issuer authentication system, a single authentication response message comprising a plurality of authentication codes, each authentication code of the plurality of authentication codes corresponding to a merchant of the plurality of merchants; and communicating, by the issuer authentication system, the single authentication response message to the merchant system, the single authentication response message configured to cause the merchant system to separately process each transaction of the plurality of transactions.

In non-limiting embodiments, the single authentication response message comprises a plurality of fields, each field of the plurality of fields comprising an authentication code of the plurality of authentication codes. In non-limiting embodiments, the merchant system comprises a merchant plug-in configured to communicate with the issuer authentication system. In non-limiting embodiments, the merchant plug-in is configured to communicate with the issuer authentication system via at least one Application Programming Interface (API). In non-limiting embodiments, the merchant system is configured to communicate with the issuer authentication system through a payment gateway. In non-limiting embodiments, the merchant system is controlled by an aggregator merchant, wherein the merchant system is in communication with a plurality of other merchant systems associated with the plurality of merchants. In non-limiting embodiments, the method further includes prompting the user for a single authentication for the plurality of transactions. In non-limiting embodiments, the method further includes separately processing, by the transaction service provider system, the plurality of transactions based on the single authentication received from the client device. In non-limiting embodiments, the single authentication request message is received by the issuer authentication system from the transaction service provider system, wherein the single authentication request message is received by the transaction service provider system from the merchant system.

According to another non-limiting embodiment, provided is a system for aggregated authentication in an online, open loop payment network, including at least one processor programmed or configured to: receive, from a merchant system, a single authentication request message to conduct a plurality of transactions with a plurality of merchants, the single authentication request message comprising an aggregation identifier, a plurality of merchant identifiers, and transaction data for each transaction of the plurality of transactions; detect the aggregation identifier in the single authentication request message; in response to detecting the aggregation identifier, generate a single authentication response message comprising a plurality of authentication codes, each authentication code of the plurality of authentication codes corresponding to a merchant of the plurality of merchants; and communicate the single authentication response message to the merchant system, the single authentication response message configured to cause the merchant system to separately process each transaction of the plurality of transactions.

In non-limiting embodiments, the system further includes an issuer authentication system including the at least one processor. In non-limiting embodiments, the single authentication response message includes a plurality of fields, each field of the plurality of fields comprising an authentication code of the plurality of authentication codes. In non-limiting embodiments, the system further includes a merchant plug-in installed at the merchant system, the merchant plug-in configured to communicate with the at least one processor. In non-limiting embodiments, the merchant plug-in is configured to communicate with the at least one processor via at least one API. In non-limiting embodiments, the at least one processor communicates with the merchant system through a payment gateway. In non-limiting embodiments, the system further includes the merchant system, wherein the merchant system is operated by an aggregator merchant, and wherein the merchant system is in communication with a plurality of other merchant systems associated with the plurality of merchants. In non-limiting embodiments, the issuer authentication system prompts the user for a single authentication for the plurality of transactions. In non-limiting embodiments, the system further includes a transaction service provider system in communication with the at least one processor, the transaction service provider system configured to process the plurality of transactions based on the single authentication received from the client device.

According to another non-limiting embodiment, provided is a computer program product for aggregated authentication in an online, open loop payment network, including at least one non-transitory computer-readable medium including program instructions that, when executed by at least one processor, cause the at least one processor to: receive, from a merchant system, a single authentication request message to conduct a plurality of transactions with a plurality of merchants, the single authentication request message comprising an aggregation identifier, a plurality of merchant identifiers, and transaction data for each transaction of the plurality of transactions; detect the aggregation identifier in the single authentication request message; in response to detecting the aggregation identifier, generate a single authentication response message comprising a plurality of authentication codes, each authentication code of the plurality of authentication codes corresponding to a merchant of the plurality of merchants; and communicate the single authentication response message to the merchant system, the single authentication response message configured to cause the merchant system to separately process each transaction of the plurality of transactions.

According to another non-limiting embodiment, provided is a computer-implemented method for aggregated authentication in an online, open loop payment network comprising an issuer authentication system, a merchant system, a client device, and a transaction service provider system, including: receiving, by the merchant system from the client device, a transaction request to conduct a plurality of transactions with a plurality of merchants; generating, by the merchant system, a single authentication request message based on the transaction request, the single authentication request message comprising an aggregation identifier, a plurality of merchant identifiers corresponding to the plurality of merchants, and transaction data for each transaction of the plurality of transactions; communicating, by the merchant system to the issuer authentication system, the single authentication request message; receiving, by the merchant system from the issuer authentication system in response to the single authentication request message, a single authentication response message comprising a plurality of authentication codes, each authentication code of the plurality of authentication codes corresponding to a merchant of the plurality of merchants; prompting, by the merchant system, the client device for a single authorization response; and in response to receiving the single authorization response from the client device, generating, by the merchant system, a plurality of authorization requests, each authorization request of the plurality of authorization requests corresponding to a transaction of the plurality of transactions.

In non-limiting embodiments, the merchant system includes a merchant plug-in configured to communicate with the issuer authentication system and generate the single authentication request message. In non-limiting embodiments, the merchant plug-in is configured to communicate with the issuer authentication system via at least one API. In non-limiting embodiments, the merchant system is configured to communicate with the issuer authentication system through a payment gateway. In non-limiting embodiments, the merchant system is controlled by an aggregator merchant, and wherein the merchant system is in communication with a plurality of other merchant systems associated with the plurality of merchants.

According to a further non-limiting embodiment, provided is a computer-implemented method for aggregated authentication in an online, open loop payment network comprising an issuer authentication system, a merchant system, a client device, and a transaction service provider system. The method includes receiving, by the transaction service provider system from the merchant system, a request to conduct a plurality of transactions with a plurality of merchants, the request comprising account data for a user; identifying, by the transaction service provider system, the issuer authentication system from a plurality of issuer authentication systems based on the account data; in response to identifying the issuer authentication system, communicating, by the transaction service provider system to the issuer authentication system, an identifier of the issuer authentication system; receiving, by the transaction service provider system from the merchant system, a plurality of authorization requests, each authorization request of the plurality of authorization requests corresponding to a transaction of the plurality of transactions; and separately processing each authorization request of the plurality of authorization requests.

In non-limiting embodiments, the method further includes verifying, by the transaction service provider system, that an account identified in the account data is enrolled for secure authentication. In non-limiting embodiments, the identifier of the issuer authentication system comprises a URL configured to redirect the client device from the merchant system to the issuer authentication system.

Further preferred and non-limiting embodiments or aspects are set forth in the following numbered clauses.

Clause 1: A computer-implemented method for aggregated authentication in an online, open loop payment network comprising an issuer authentication system, a merchant system, a client device, and a transaction service provider system, comprising: receiving, by the issuer authentication system from the merchant system, a single authentication request message to conduct a plurality of transactions with a plurality of merchants, the single authentication request message comprising an aggregation identifier, a plurality of merchant identifiers, and transaction data for each transaction of the plurality of transactions; detecting, by the issuer authentication system, the aggregation identifier in the single authentication request message; in response to detecting the aggregation identifier, generating, by the issuer authentication system, a single authentication response message comprising a plurality of authentication codes, each authentication code of the plurality of authentication codes corresponding to a merchant of the plurality of merchants; and communicating, by the issuer authentication system, the single authentication response message to the merchant system, the single authentication response message configured to cause the merchant system to separately process each transaction of the plurality of transactions.

Clause 2: The computer-implemented method of clause 1, wherein the single authentication response message comprises a plurality of fields, each field of the plurality of fields comprising an authentication code of the plurality of authentication codes.

Clause 3: The method of clauses 1 or 2, wherein the merchant system comprises a merchant plug-in configured to communicate with the issuer authentication system.

Clause 4: The method of any of clauses 1-3, wherein the merchant plug-in is configured to communicate with the issuer authentication system via at least one Application Programming Interface (API).

Clause 5: The method of any of clauses 1-4, wherein the merchant system is configured to communicate with the issuer authentication system through a payment gateway.

Clause 6: The method of any of clauses 1-5, wherein the merchant system is controlled by an aggregator merchant, and wherein the merchant system is in communication with a plurality of other merchant systems associated with the plurality of merchants.

Clause 7: The method of any of clauses 1-6, further comprising prompting a user for a single authentication for the plurality of transactions.

Clause 8: The method of any of clauses 1-7, wherein the single authentication request message is received by the issuer authentication system from the transaction service provider system, and wherein the single authentication request message is received by the transaction service provider system from the merchant system.

Clause 9: A system for aggregated authentication in an online, open loop payment network, comprising at least one processor programmed or configured to: receive, from a merchant system, a single authentication request message to conduct a plurality of transactions with a plurality of merchants, the single authentication request message comprising an aggregation identifier, a plurality of merchant identifiers, and transaction data for each transaction of the plurality of transactions; detect the aggregation identifier in the single authentication request message; in response to detecting the aggregation identifier, generate a single authentication response message comprising a plurality of authentication codes, each authentication code of the plurality of authentication codes corresponding to a merchant of the plurality of merchants; and communicate the single authentication response message to the merchant system, the single authentication response message configured to cause the merchant system to separately process each transaction of the plurality of transactions.

Clause 10: The system of clause 9, further comprising an issuer authentication system, the issuer authentication system including the at least one processor.

Clause 11: The system of clauses 9 or 10, wherein the single authentication response message comprises a plurality of fields, each field of the plurality of fields comprising an authentication code of the plurality of authentication codes.

Clause 12: The system of any of clauses 9-11, further comprising a merchant plug-in installed at the merchant system, the merchant plug-in configured to communicate with the at least one processor.

Clause 13: The system of any of clauses 9-12, wherein the merchant plug-in is configured to communicate with the at least one processor via at least one Application Programming Interface (API).

Clause 14: The system of any of clauses 9-13, wherein the at least one processor communicates with the merchant system through a payment gateway.

Clause 15: The system of any of clauses 9-14, further comprising the merchant system, wherein the merchant system is operated by an aggregator merchant, and wherein the merchant system is in communication with a plurality of other merchant systems associated with the plurality of merchants.

Clause 16: The system of any of clauses 9-15, wherein the at least one processor is further programmed or configured to prompt a user for a single authentication for the plurality of transactions.

Clause 17: A computer program product for aggregated authentication in an online, open loop payment network, comprising at least one non-transitory computer-readable medium including program instructions that, when executed by at least one processor, cause the at least one processor to: receive, from a merchant system, a single authentication request message to conduct a plurality of transactions with a plurality of merchants, the single authentication request message comprising an aggregation identifier, a plurality of merchant identifiers, and transaction data for each transaction of the plurality of transactions; detect the aggregation identifier in the single authentication request message; in response to detecting the aggregation identifier, generate a single authentication response message comprising a plurality of authentication codes, each authentication code of the plurality of authentication codes corresponding to a merchant of the plurality of merchants; and communicate the single authentication response message to the merchant system, the single authentication response message configured to cause the merchant system to separately process each transaction of the plurality of transactions.

Clause 18: A computer-implemented method for aggregated authentication in an online, open loop payment network comprising an issuer authentication system, a merchant system, a client device, and a transaction service provider system, comprising: receiving, by the merchant system from the client device, a transaction request to conduct a plurality of transactions with a plurality of merchants; generating, by the merchant system, a single authentication request message based on the transaction request, the single authentication request message comprising an aggregation identifier, a plurality of merchant identifiers corresponding to the plurality of merchants, and transaction data for each transaction of the plurality of transactions; communicating, to the issuer authentication system, the single authentication request message; receiving, by the merchant system from the issuer authentication system in response to the single authentication request message, a single authentication response message comprising a plurality of authentication codes, each authentication code of the plurality of authentication codes corresponding to a merchant of the plurality of merchants; and in response to receiving a single authorization response from the client device, generating, by the merchant system, a plurality of authorization requests, each authorization request of the plurality of authorization requests corresponding to a transaction of the plurality of transactions.

Clause 19: The computer-implemented method of clause 18, wherein the merchant system comprises a merchant plug-in configured to communicate with the issuer authentication system and generate the single authentication request message.

Clause 20: The computer-implemented method of clauses 18 or 19, wherein the merchant plug-in is configured to communicate with the issuer authentication system via at least one Application Programming Interface (API).

Clause 21: The computer-implemented method of any of clauses 18-20, wherein the merchant system is configured to communicate with the issuer authentication system through a payment gateway.

Clause 22: The computer-implemented method of any of clauses 18-21, wherein the merchant system is controlled by an aggregator merchant, and wherein the merchant system is in communication with a plurality of other merchant systems associated with the plurality of merchants.

Clause 23: The computer-implemented method of any of clauses 18-22, further comprising redirecting the client device from the merchant system to the issuer authentication system to prompt a user for the single authorization response.

Clause 24: A computer-implemented method for aggregated authentication in an online, open loop payment network comprising an issuer authentication system, a merchant system, a client device, and a transaction service provider system, comprising: receiving, by the transaction service provider system from the merchant system, a request to conduct a plurality of transactions with a plurality of merchants, the request comprising account data for a user; identifying, by the transaction service provider system, the issuer authentication system from a plurality of issuer authentication systems based on the account data; in response to identifying the issuer authentication system, communicating, by the transaction service provider system to the issuer authentication system, an identifier of the issuer authentication system; receiving, by the transaction service provider system from the merchant system, a plurality of authorization requests, each authorization request of the plurality of authorization requests corresponding to a transaction of the plurality of transactions; and separately processing each authorization request of the plurality of authorization requests.

Clause 25: The computer-implemented method of clause 24, further comprising verifying, by the transaction service provider system, that an account identified in the account data is enrolled for secure authentication.

Clause 26: The computer-implemented method of clauses 24 or 25, wherein the identifier of the issuer authentication system comprises a Uniform Resource Locator (URL) configured to redirect the client device from the merchant system to the issuer authentication system.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

Non-limiting embodiments of the present invention are directed to a system, method, and apparatus for processing a plurality of separate transactions based on a single authentication in an online, open loop payment network. Non-limiting embodiments allow for a merchant system to facilitate payments made from a user or other entity to multiple, separate recipients without requiring multiple authentications. Non-limiting embodiments utilize a unique single authentication request message having an aggregation identifier and a specific flow of messages and responses among the nodes of a payment network. This arrangement provides for improved efficiencies of computing resources, such as network bandwidth, memory, and computational power, by reducing the number of authentication messages, by avoiding the need for every node to separately process each transaction, and by only requiring a single authentication from the individual or entity that is providing the payment to the recipients. It will be appreciated that various other efficiencies and benefits are provided with non-limiting embodiments of the invention.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "account identifier" may include one or more personal account numbers (PANs), tokens, or other identifiers associated with a user account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "issuer institution" may refer to one or more entities, such as a bank, that provide accounts to users for conducting transactions (e.g., payment transactions), such as initiating credit and/or debit payments. For example, an issuer institution may provide an account identifier, such as a PAN, to a user that uniquely identifies one or more accounts associated with that user. The account identifier may be embodied on a portable financial device, such as a physical financial instrument, e.g., a payment card, and/or may be electronic and used for electronic payments. The term "issuer system" refers to one or more computer systems, computing devices, software applications, and/or the like operated by or on behalf of an issuer institution, such as a server computer executing one or more software applications. For example, an issuer system may include one or more authorization servers for authorizing a transaction, one or more authentication servers for authenticating a transaction, and/or one or more databases of account data. An issuer system may include a separate or integrated issuer authentication system, such as an Access Control Server (ACS), for authenticating online transactions. An issuer institution may be associated with a bank identification number (BIN) or other unique identifier that uniquely identifies it among other issuer institutions.

As used herein, the term "acquirer institution" may refer to an entity licensed and/or approved by the transaction service provider to originate transactions (e.g., payment transactions) using a portable financial device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computer systems, computing devices, software applications, and/or the like operated by or on behalf of an acquirer institution.

As used herein, the term "merchant" may refer to an individual or entity that provides goods and/or services, or access to goods and/or services, to users (e.g., users) based on a transaction (e.g., a payment transaction). The term "merchant system" may refer to one or more computer systems, computing devices, and/or software applications operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

The term "client device," as used herein, refers to any electronic device that is configured to communicate with one or more remote devices or systems, such as a server. A client device may include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), and/or any other device, system, and/or software application configured to communicate with a remote device or system.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a user, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "authentication" refers to a process of proving or verifying the identity of an individual. In the context of a payment network, an account holder associated with a portable financial device corresponding to an account number may be asked to authenticate himself or herself, or a separate system or entity may be asked to authenticate the account holder, before a transaction is completed between the account holder's payment account and another individual or entity, such as a merchant. Various authentication methods and protocols may be used to authenticate a user, such as but not limited to the 3-D Secure protocol. The 3-D Secure protocol is a three-domain model used for Internet-based transactions that consider an acquirer domain (e.g., an acquirer institution), an issuer domain (e.g., an issuer institution), and an interoperability domain (e.g., the payment network infrastructure). An "authentication request message," as used herein, refers to a message configured to request authentication from a user or system. An "authentication response message," as used herein, refers to a message configured to provide one or more authentication codes that may be used to authenticate an account holder.

As used herein, the term "authorization" refers to a process of providing, receiving, and/or obtaining permission. In the context of a payment network, an issuer institution that issued a portable financial device to a user may authorize a transaction being requested by the account holder by, for example, determining that the account is valid and that a sufficient amount of funds or credit is available for the transaction. An "authorization request message," as used herein, refers to a message configured to request authorization from an issuer institution, transaction service provider, or other entity. An "authorization response message," as used herein, refers to a message that conveys an authorization response (e.g., authorized or not authorized).

Figure 1:
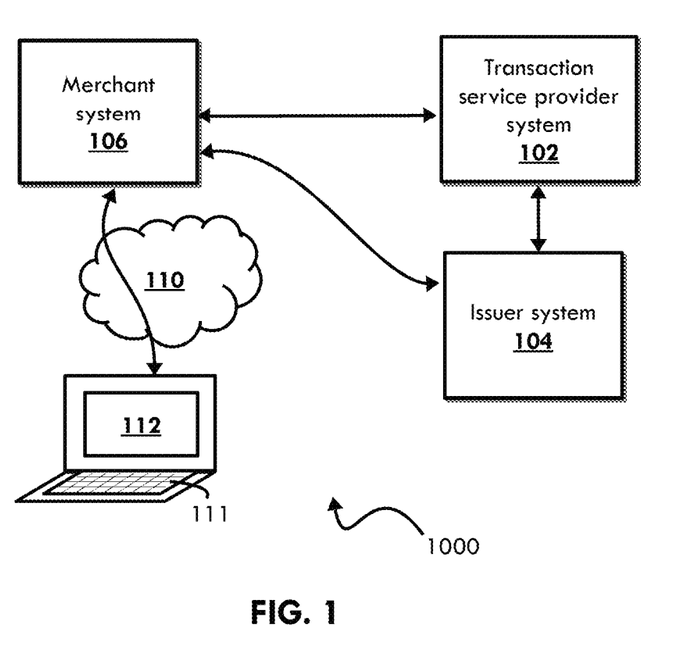
FIG. 1 is a schematic diagram of a system for aggregated authentication according to a non-limiting embodiment.

Referring now to FIG. 1, a system for aggregated authentication is shown according to a non-limiting embodiment. The system 1000 shown in FIG. 1 includes components of an open loop payment network in which a transaction service provider facilitates processing and settlement of transactions between issuer institutions and acquirer institutions. A merchant system 106 is in communication with a client device 111 via a network environment 110, such as the Internet. The merchant system 106 may be operated by a merchant that acts as an aggregator or marketplace merchant. For example, the merchant operating the merchant system 106 may be an online mall or marketplace through which multiple other merchants provide goods and/or services. A user operating the client device 111 may visit a webpage or other graphical user interface (GUI) 112 of the merchant system 106 through a web browser or other software application. Through the GUI 112, the user may select goods and/or services from a plurality of different merchants, add the goods and/or services to an online shopping cart, and check out through the GUI 112 or an additional GUI presented by the merchant system 106.

With continued reference to FIG. 1, when the user chooses to check out and complete the transactions for the goods and/or services selected through the GUI 112 of the merchant system 106, the merchant system 106 generates a single authentication request message and communicates it to the issuer system 104. The single authentication request message may be communicated directly to the issuer system 104 or, in other examples, may be communicated to the issuer system 104 indirectly through the transaction service provider system 102, a payment gateway (not shown in FIG. 1), or any other system. The issuer system 104 may include an issuer authentication system that receives and processes the single authentication request message.

The authentication request message may be structured in various ways. For example, in non-limiting embodiments, the authentication request messages and authentication response messages may be structured in eXtensible Markup Language (XML) or any other format or data structure, such as JavaScript Object Notation (JSON), one or more arrays, and/or the like.

The single authentication request message includes an aggregation identifier that identifies the single authentication request message as an aggregated authentication request message. The aggregation identifier may include, for example, one or more flags or other variables inserted into one or more fields of the authentication request message. The aggregation identifier may in some non-limiting embodiments be a binary value in which a value of "1" or TRUE identifies the authentication request message as an aggregated authentication request message. In some non-limiting embodiments, an aggregation identifier may be a signature, size, or structure of the authentication request message, such as an authentication request message that includes multiple additional fields. It will be appreciated that numerous other arrangements are possible.

Still referring to FIG. 1, once the issuer system 104 receives the single authentication request message, the issuer authentication system 104 processes the message and determines if the message is an aggregated authentication request message based on whether an aggregation identifier is included in the message. In response to determining that the message is an aggregated authentication request message, the issuer system 104 authenticates the user. The issuer system 104 may authenticate the user by, for example, prompting the user to input credentials, such as but not limited to a user name, password, biometric input, key, and/or the like. In some non-limiting embodiments, the credential may be a one-time key that is communicated to the client device 111 via a text message. In some non-limiting embodiments, the user may be redirected from a merchant website to a website of the issuer system 104, such as a website provided by an issuer ACS. In other non-limiting embodiments, a user may be prompted to authenticate himself or herself through an application on the client device 111 or another client device, such as a mobile phone, based on the issuer system 104 communicating a signal or taking control over some functionality of the client device 111. In other examples, a user may authenticate himself or herself on the merchant website through an embedded authentication tool, such as input boxes and selectable options provided by the issuer authentication system 105. It will be appreciated that the issuer system 104, transaction service provider system 102, a payment gateway (not shown in FIG. 1), an e-wallet application (not shown in FIG. 1), and/or any other system may prompt the user for authentication. In this manner, the user only authenticates himself or herself only once for the single aggregated transaction.

Once the issuer system 104 authenticates the user requesting the aggregated transaction, the issuer system 104 determines an authentication code for each merchant of the multiple merchants identified in the single authentication request message. In a non-limiting embodiment, a separate authentication code will correspond to each separate merchant. The issuer system 104 determines an authentication code by generating it or identifying it from a database. The issuer authentication system 104 then generates a single authentication response message and communicates it to the merchant system 106.

The authentication codes may include, for example, Universal Cardholder Authentication Field (UCAF) identifiers for each intended recipient that are included in one or more fields of the authentication response message. The UCAF identifier may depend upon the payment network and may include, for example, a Cardholder Authentication Verification Value (CAVV). The authentication response message may also include Electronic Commerce Indicator (ECI) identifiers for each intended recipient in one or more fields. It will be appreciated that various identifiers and data may be used instead of or in addition to UCAF and ECI identifiers. The authentication codes are eventually communicated to an acquirer system for settling transactions.

Still referring to FIG. 1, the merchant system 106, in response to receiving the single authentication response message with multiple authentication codes, processes the single authentication response message to identify each individual authentication code. The merchant system 106 then generates multiple separate authorization request messages, which differ from authentication request messages in structure, content, and/or function, for each individual transaction of the multiple transactions with multiple merchants. In this manner, each authentication code is used to generate each individual authorization request message. The individual authorization request messages may include one or more authentication flags or other authentication data to indicate that the transaction was authenticated.

With continued reference to FIG. 1, once multiple authorization request messages are generated, they are then communicated by the merchant system 106 to the issuer system 104 and/or transaction service provider system 102 to be processed as regular payment transactions. In non-limiting embodiments, each authorization request message is processed by the issuer system 104 and, once the issuer system 104 authorizes the transaction, the issuer system 104 returns an authorization response message. If the authorization response message indicates that the transaction is authorized, the transaction service provider system 102 facilitates the payment to be made from the issuer institution corresponding to the issuer system 104 to an acquiring institution corresponding to the individual merchant for that transaction. In this manner, the account holder's account statement may list each individual transaction individually, even though the account holder only authenticated a single time, making it more efficient to keep records and simpler to dispute erroneous or fraudulent charges with individual merchants.

Figure 2:
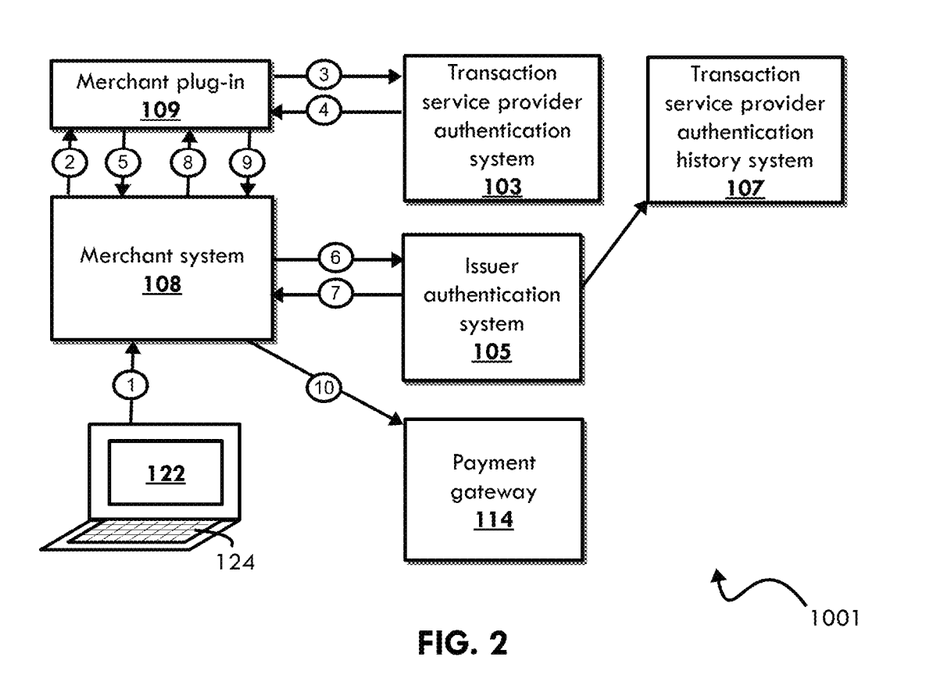
FIG. 2 is another schematic diagram of a system for aggregated authentication according to a non-limiting embodiment.

Referring now to FIG. 2, a system 1001 for aggregated authentication is shown according to a non-limiting embodiment. The system 1001 includes a merchant system 108, merchant plug-in (MPI) 109, transaction service provider authentication system 103, transaction service provider authentication history system 107, issuer authentication system 105, and payment gateway 114. The components of the system 1001 may be in communication via one or more network connections. The MPI 109 may include software executing on the merchant system 108, such as a web server used by the merchant. The transaction service provider authentication system 103 may include one or more processors and/or software applications and may be part of or separate from a transaction service provider system 102 (not shown in FIG. 2). In a non-limiting embodiment, the transaction service provider authentication system 103 may include a 3-D Secure service provided by a transaction service provider of a payment network. The issuer authentication system 105 may include one or more processors and/or software applications and may be part of or separate from the issuer system 104 (not shown in FIG. 2). In a non-limiting embodiment, the transaction service provider authentication system 103 may include an ACS server.

With continued reference to FIG. 2, a user may operate a client device 124 to access a GUI 122, such as a merchant website, and conduct an aggregate transaction with the merchant system 108. At step (1), the client device 124 communicates a request to conduct an aggregated transaction. At step (2), the merchant system 108 communicates transaction data and/or account data to the MPI 109 and, at step (3), the data is communicated to the transaction service provider authentication system 103. In other non-limiting embodiments, the 108 may communicate with the transaction service provider authentication system 103 without the use of the MPI 109, utilizing an Application Programming Interface (API) or other technique. For example, a Representational State Transfer (REST) API (e.g., RESTful API) may be utilized. The transaction service provider authentication system 103, in response to receiving at least account data from the merchant system 108, determines if the account holder is enrolled in a service that permits usage of the transaction service provider authentication system 103. Once the transaction service provider authentication system 103 verifies that the account holder is enrolled, the transaction service provider authentication system 103 communicates a verification message to the MPI 109 at step (4). The verification message may include, for example, a Uniform Resource Locator ("URL") pointing to the issuer authentication system 105. At step (5) the MPI 109 passes the verification message to the merchant system 108. The merchant system 108 or MPI 109 generates a single authentication request message in response to receiving the verification message.

Still referring to FIG. 2, at step (6) the merchant system 108 communicates the single authentication request message to the issuer authentication system 105. In some non-limiting embodiments, the single authentication request message may be communicated to the issuer authentication system 105 via the payment gateway 114. In response to receiving the authentication request message, the issuer authentication system 105 processes the authentication request message to determine whether the transaction is an aggregated transaction by, for example, identifying an aggregation identifier. In response to determining that the transaction is an aggregated transaction, the issuer authentication system 105 authenticates the user.

With continued reference to FIG. 2, the issuer authentication system 105 may authenticate the user by, for example, prompting the user to input credentials, such as but not limited to a user name, password, biometric input, key, and/or the like. In some non-limiting embodiments, the user may be redirected from a merchant website to a website of the issuer authentication system 105, such as a website provided by an issuer ACS server, based on the URL returned from the transaction service provider authentication system 103 at step (4). In other non-limiting embodiments, a user may be prompted to authenticate himself or herself through an application on the client device 124 or another client device, such as a mobile phone. In other examples, a user may authenticate himself or herself on the merchant website through an embedded authentication tool, such as input boxes and selectable options provided by the issuer authentication system 105. It will be appreciated that the issuer authentication system 105, transaction service provider authentication system 103, payment gateway 114, an e-wallet application (not shown in FIG. 2), and/or any other system may prompt the user for authentication. In this manner, the user only authenticates himself or herself only once for the single aggregated transaction. It will be appreciated that authentication may be provided in various other ways.

Still referring to FIG. 2, in response to authenticating the user, the issuer authentication system 105 identifies each merchant of multiple merchants identified in the message and, for each merchant or individual transaction, determines an authentication code. The issuer authentication system 105 generates an authentication response message based on the identified merchants and the authentication codes and, at step (7), communicates the authentication response message to the merchant system 108. The merchant system 108 communicates the authentication response message to the MPI 109 at step (8).

With continued reference to FIG. 2, the MPI 109, in response to receiving the authentication response message, determines whether the transaction is authenticated. This may include, for example, processing each of the authentication codes in the authentication response message and/or prompting a user for input through the client device 124. The MPI 109, at step (9), communicates the authentication result and any associated authentication data to the merchant system. At step (10), the transaction data for each individual transaction is sent to a payment gateway 114, acquirer system (not shown in FIG. 2), or any other entity for processing the individual transactions. In non-limiting embodiments, the merchant system 108 may generate multiple authorization request messages and communicate the messages to the payment gateway 114.

Figure 3:
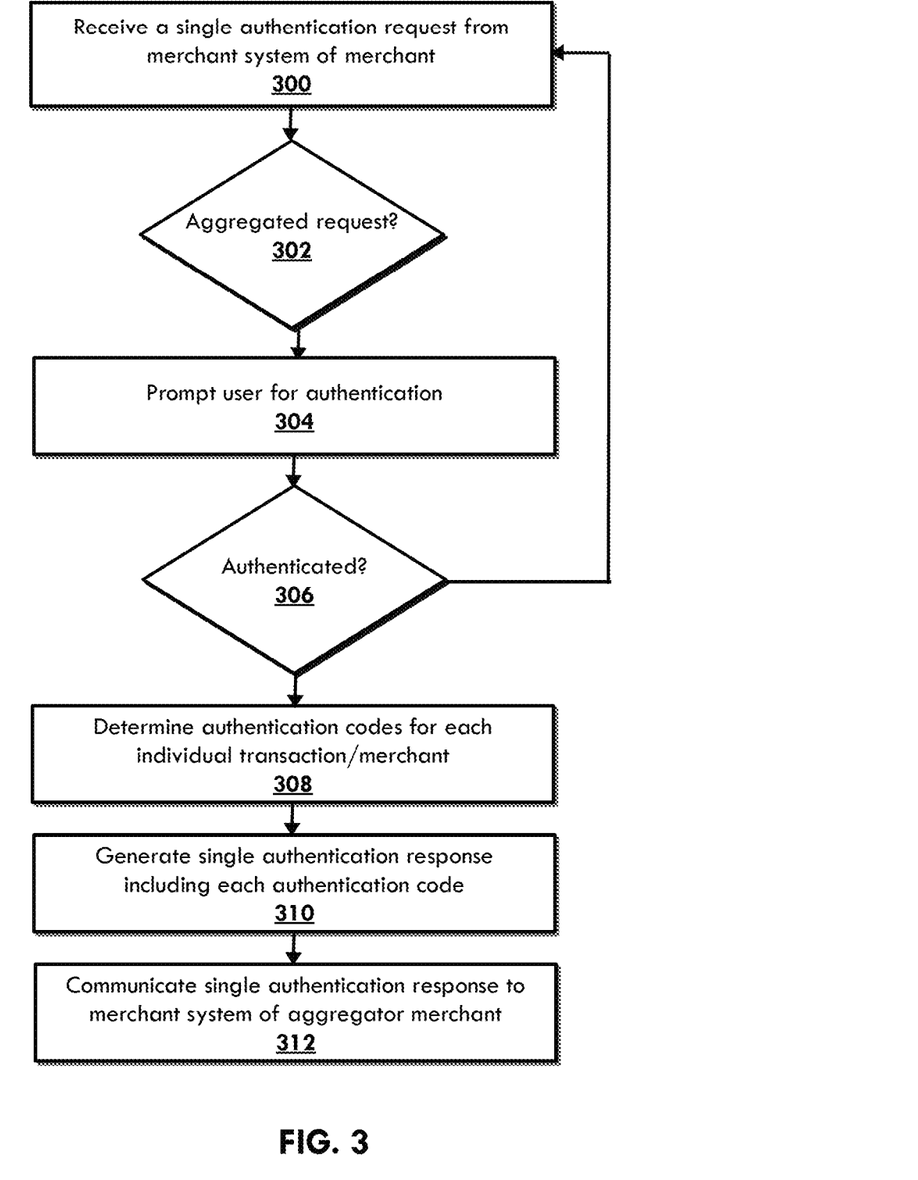
FIG. 3 is a step diagram of a method for aggregated authentication according to a non-limiting embodiment.

Referring now to FIG. 3, a step diagram for a method for aggregated authentication is shown according to a non-limiting embodiment. The step diagram in FIG. 3 is shown from the perspective of an issuer authentication system, although it will be appreciated that one or more other systems may perform one or more steps in one or more orders. At a first step 300, the issuer authentication system receives a single authentication request message from a merchant system. The issuer authentication system may receive the authentication request message as it would receive any authentication request message from a merchant system. Once the issuer authentication system receives the message, the issuer authentication system, at step 302, determines if the authentication request message is an aggregated authentication request message. The issuer authentication system may make this determination based on an aggregation identifier in the message, as an example. If the authentication request message is an aggregated authentication request message, the method proceeds to step 304 in which the issuer authentication system prompts the user for authentication. The user may be prompted for authentication through a client device. In some non-limiting embodiments, the issuer authentication system may prompt the user for authentication after the client device operated by the user is pointed to the issuer authentication system from the merchant system through, for example, a redirection URL or other mechanism.

With continued reference to FIG. 3, at step 306 the issuer authentication system determines if the user is authenticated. As an example, the issuer authentication system may compare user credentials (e.g., user name, password, key, user identifier, device identifier, etc.) with stored user credentials. If the user is not authenticated, the method ends and returns to step 300 to receive a next authentication request message. If the user is authenticated, the method proceeds to step 308 and the issuer authentication system determines authentication codes for each individual transaction and/or merchant identified in the aggregated message. If the authentication request message is not an aggregated authentication request message, then the issuer authentication system determines a single authentication code for the single requested transaction. The authentication codes may be generated or identified from a database, as examples. The issuer authentication system, at step 310, generates a single authentication response message including each authentication code determined at step 308. The single authentication response message is communicated to the merchant system at step 312.

Figure 4:
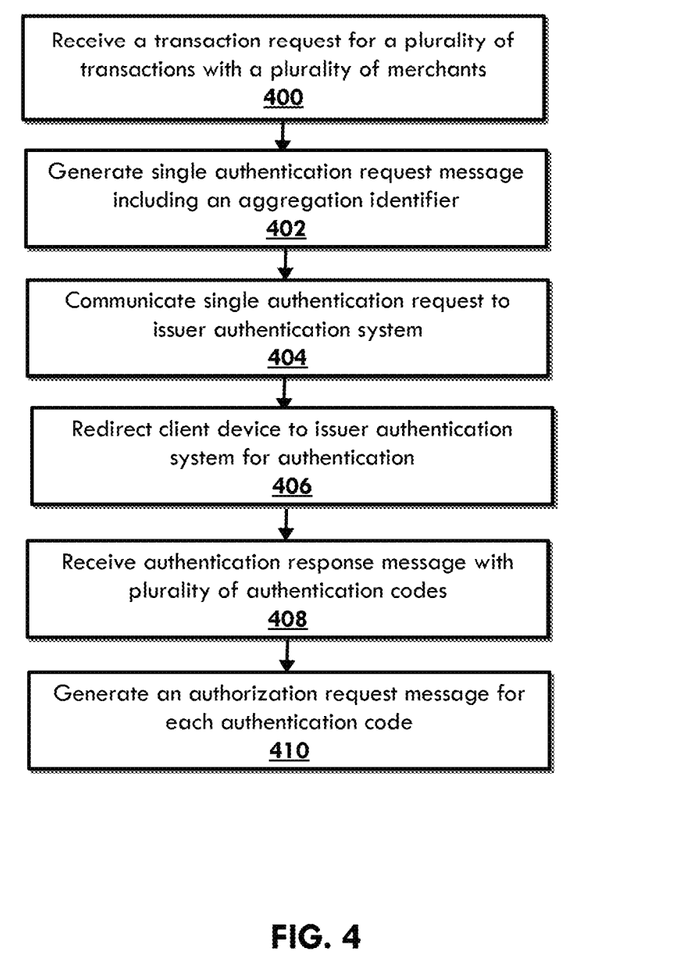
FIG. 4 is a step diagram of a method for aggregated authentication according to a non-limiting embodiment.

Referring now to FIG. 4, a step diagram for a method for aggregated authentication is shown according to a non-limiting embodiment. The step diagram in FIG. 4 is shown from the perspective of a merchant system, which may include an MPI, although it will be appreciated that one or more other systems may perform one or more steps in one or more orders. At a first step 400, the merchant system receives a transaction request from a user to conduct a plurality of transactions with a plurality of merchants. The transaction request may be received through a merchant website or software application accessed by a client device. At step 402, the merchant system generates a single authentication request message including an aggregation identifier, merchant identifiers for each individual merchant, and other transaction data. At step 404, the merchant system communicates the single authentication request message to an applicable issuer authentication system.

Still referring to FIG. 4, at step 406, the merchant system redirects the client device to the issuer authentication system for the user to be authenticated. The issuer authentication system and/or redirection URL may be identified by communicating transaction data and/or account data to the transaction service provider authentication system and receiving such information in response. At step 408 the merchant system receives a single authentication response message, including a plurality of authentication codes, from the issuer authentication system. At step 410, the merchant system generates a separate, individual authorization request message for each individual transaction corresponding to an individual authentication code. These authorization request messages are then processed in any manner, such as by communicating them to a payment gateway, acquirer system, or transaction service provider system for further processing and handling.

Figure 5:
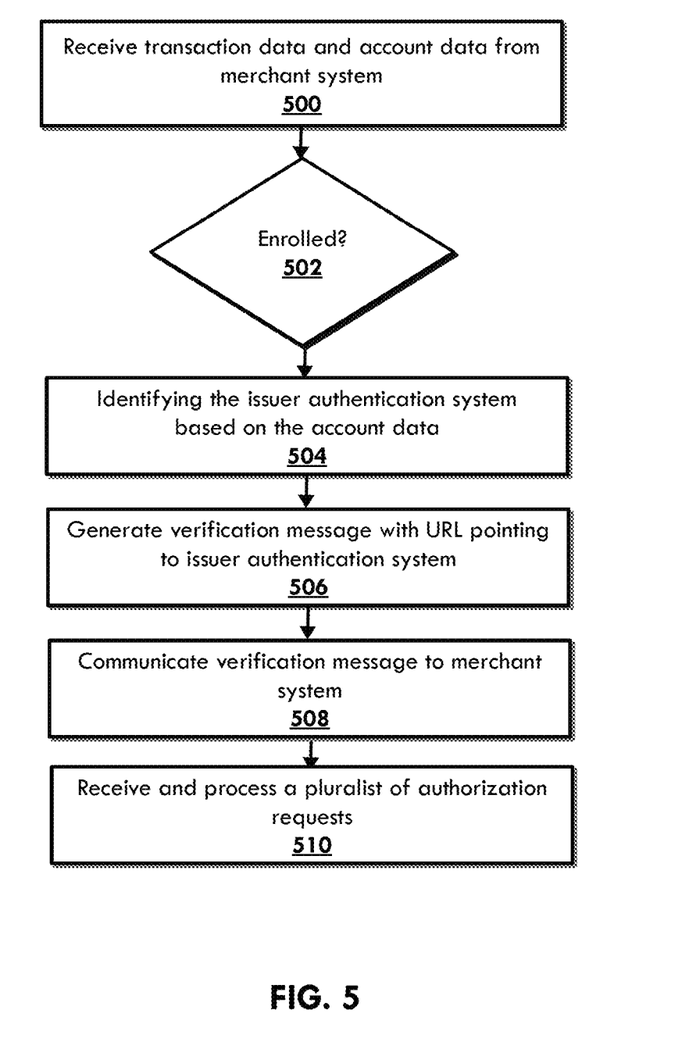
FIG. 5 is a step diagram of a method for aggregated authentication according to a non-limiting embodiment.

Referring now to FIG. 5, a step diagram for a method for aggregated authentication is shown according to a non-limiting embodiment. The step diagram in FIG. 5 is shown from the perspective of a transaction service provider system, including a transaction service provider authentication system such as a 3-D Secure service, although it will be appreciated that other entities and/or systems may perform one or more steps. At step 500, transaction data and/or account data is received from a merchant system. At step 502, the transaction service provider authentication system determines if the user is enrolled for secure authentication. The transaction service provider authentication system may determine if a user is enrolled by querying an enrollment database based on a user identifier, account identifier, BIN, and/or the like. If the user is enrolled at step 502, the method proceeds to step 504 in which the transaction service provider authentication system identifies the issuer authentication system that corresponds to the account data by identifying an issuer institution that issued the account being used for the transaction.

With continued reference to FIG. 5, the transaction service provider authentication system generates a verification message at step 506 including a URL pointing to the issuer authentication system identified at step 504. At step 508, the verification message is communicated to the merchant system such that the merchant system can redirect the client device operated by the user to the issuer authentication system through the URL or other mechanism. At step 510, after the aggregated transaction has been processed by the issuer authentication system and merchant system, the transaction service provider receives and processes a plurality of authorization requests for individual transactions at step 510. The individual transactions correspond to the single request received at step 500 and the single verification message generated at step 506.

Figure 6A:
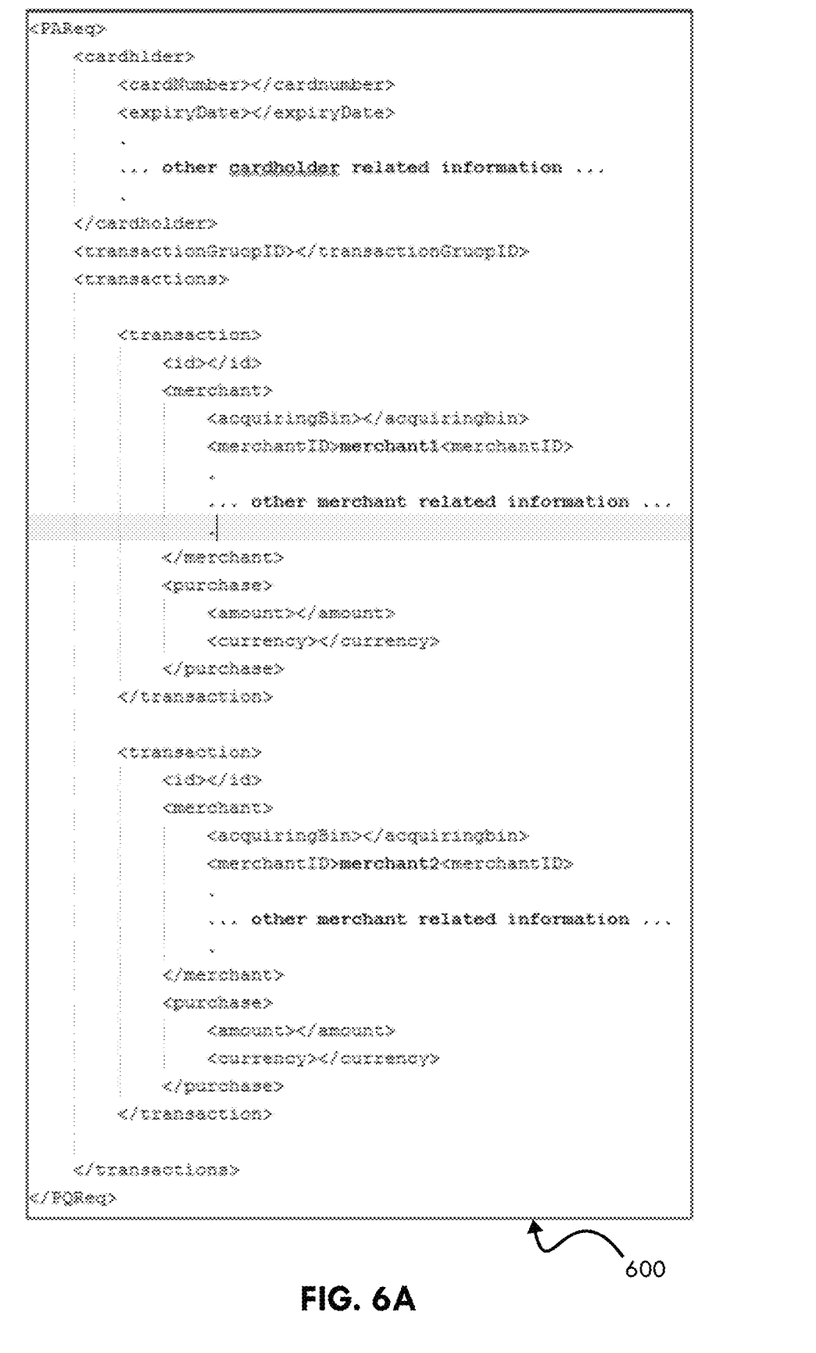
FIG. 6A is an authentication request message according to a non-limiting embodiment.

Referring now to FIG. 6A, an authentication request message 600 is shown according to a non-limiting embodiment. In this example, the authentication request message 600 is formatted in an XML format with tags identifying parameters. As can be seen, the tag <transactions> includes multiple individual transactions identified by the tag <transaction> and, for each <transaction>, an identifier having an <id> tag. Each <transaction> tag also includes other transaction data for that transaction, such as a <merchantID> tag (merchant identifier), an <acquiringBin> tag (acquirer institution identifier or BIN), an <amount> tag (purchase amount), and a <currency> tag (currency type). The <transactionGroupID> tag may serve as an aggregation identifier that identifies the authentication request message 600 as an aggregated authentication request message. It will be appreciated that various other parameters and formats may be used for structuring the authentication request message 600.

Figure 6B:
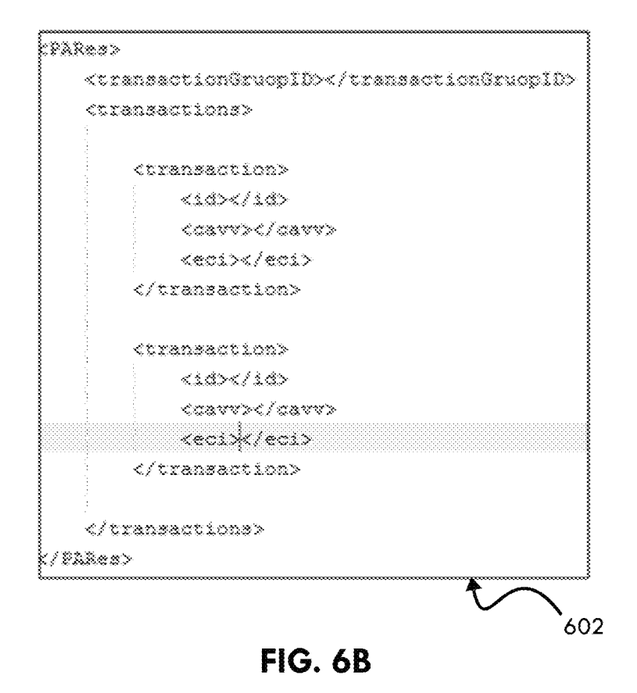
FIG. 6B is an authentication response message according to a non-limiting embodiment.

Referring now to FIG. 6B, an authentication response message 602 is shown according to a non-limiting embodiment. In this example, the authentication response message 602 is formatted in an XML format with tags identifying parameters. As can be seen, and similar to the authentication request message 600 shown in FIG. 6A, the tag <transactions> includes multiple individual transactions identified by the tag <transaction> and, for each <transaction>, an identifier having an <id> tag. In addition, the authentication response message 602 includes authentication codes for each transaction identified by the <cavv> and <eci> tags. It will be appreciated that various other parameters and formats may be used for structuring the authentication response message 602.

In non-limiting embodiments, an aggregator merchant may operate an online marketplace. For example, an aggregator merchant may facilitate a user to pay bills for multiple different utility companies, such as electricity, phone, and water, by using a single authentication to effectuate all of the payments. An aggregator merchant may also include an online shopping mall or marketplace in which multiple merchants provide goods and/or services. In this manner, a user only needs to check out a single time through a website or application provided by the aggregator merchant. The aggregator merchant authorizes the multiple payments separately on the back-end for settling with different acquirer institutions (e.g., different acquirer institutions associated with different merchants) such that the separate authorizations and entries appear on the user's credit card or bank statements.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for aggregated authentication in an online, open loop payment network comprising an issuer authentication system, a merchant system, a client device, and a transaction service provider system, comprising:

receiving, by the issuer authentication system from the merchant system, a single authentication request message configured to authenticate a user of a portable financial device once for a plurality of transactions between the user and a plurality of merchants, the single authentication request message comprising (i) an aggregation identifier in one or more fields of the single authentication request message to identify the single authentication request message as an aggregated authentication request message, (ii) a plurality of merchant identifiers, and (iii) transaction data for each transaction of the plurality of transactions;

in response to receiving the single authentication request message, authenticating, by the issuer authentication system, the user by verifying an identity of the user;

detecting, by the issuer authentication system, the aggregation identifier in the single authentication request message;

in response to detecting the aggregation identifier, generating, by the issuer authentication system, a single authentication response message comprising a plurality of authentication codes, each authentication code of the plurality of authentication codes corresponding to a merchant of the plurality of merchants and a transaction of the plurality of transactions; and causing, by the issuer authentication system transmitting the single authentication response message comprising the plurality of authentication codes to the merchant system, the merchant system to separately process each transaction of the plurality of transactions by:

corresponding each authentication code of the plurality of authentication codes with a transaction of the plurality of transactions; and for each transaction of the plurality of transactions, generating a separate authorization request message to a transaction processing system to request a transfer of payment from an account of the user to an account of a merchant of the plurality of merchants, wherein the separate authorization request message comprises authentication data based on a corresponding authentication code of the plurality of authentication codes to indicate that each transaction was authenticated by the issuer authentication system.

2. The computer-implemented method of claim 1, wherein the single authentication response message comprises a plurality of fields, each field of the plurality of fields comprising an authentication code of the plurality of authentication codes.

3. The computer-implemented method of claim 1, wherein the merchant system comprises a merchant plug-in configured to communicate with the issuer authentication system.

4. The computer-implemented method of claim 3, wherein the merchant plug-in is configured to communicate with the issuer authentication system via at least one Application Programming Interface (API).

5. The computer-implemented method of claim 1, wherein the merchant system is configured to communicate with the issuer authentication system through a payment gateway.

6. The computer-implemented method of claim 1, wherein the merchant system is controlled by an aggregator merchant, and wherein the merchant system is in communication with a plurality of other merchant systems associated with the plurality of merchants.

7. The computer-implemented method of claim 1, further comprising prompting a user for a single authentication for the plurality of transactions.

8. The computer-implemented method of claim 1, wherein the single authentication request message is received by the issuer authentication system from the transaction service provider system, and wherein the single authentication request message is received by the transaction service provider system from the merchant system.

9. A system for aggregated authentication in an online, open loop payment network, comprising at least one processor programmed or configured to:
receive, from a merchant system, a single authentication request message configured to authenticate a user of a portable financial device for a plurality of transactions between the user and a plurality of merchants, the single authentication request message comprising (i) an aggregation identifier in one or more fields of the single authentication request message to identify the single authentication request message as an aggregated authentication request message, (ii) a plurality of merchant identifiers, and (iii) transaction data for each transaction of the plurality of transactions;
in response to receiving the single authentication request message, authenticate the user by verifying an identity of the user;
detect the aggregation identifier in the single authentication request message;
in response to detecting the aggregation identifier, generate a single authentication response message comprising a plurality of authentication codes, each authentication code of the plurality of authentication codes corresponding to a merchant of the plurality of merchants and a transaction of the plurality of transactions; and
cause, by transmitting the single authentication response message comprising the plurality of authentication codes to the merchant system, the merchant system to separately process each transaction of the plurality of transactions by:
corresponding each authentication code of the plurality of authentication codes with a transaction of the plurality of transactions; and
for each transaction of the plurality of transactions, generating a separate authorization request message to a transaction processing system to request a transfer of payment from an account of the user to an account of a merchant of the plurality of merchants, wherein the separate authorization request message comprises authentication data based on a corresponding authentication code of the plurality of authentication codes to indicate that each transaction was authenticated by an issuer authentication system.

10. The system of claim 9, further comprising the issuer authentication system, the issuer authentication system including the at least one processor.

11. The system of claim 9, wherein the single authentication response message comprises a plurality of fields, each field of the plurality of fields comprising an authentication code of the plurality of authentication codes.

12. The system of claim 9, further comprising a merchant plug-in installed at the merchant system, the merchant plug-in configured to communicate with the at least one processor.

13. The system of claim 12, wherein the merchant plug-in is configured to communicate with the at least one processor via at least one Application Programming Interface (API).

14. The system of claim 9, wherein the at least one processor communicates with the merchant system through a payment gateway.

15. The system of claim 9, further comprising the merchant system, wherein the merchant system is operated by an aggregator merchant, and wherein the merchant system is in communication with a plurality of other merchant systems associated with the plurality of merchants.

16. The system of claim 9, wherein the at least one processor is further programmed or configured to prompt a user for a single authentication for the plurality of transactions.

17. A computer program product for aggregated authentication in an online, open loop payment network, comprising at least one non-transitory computer-readable medium including program instructions that, when executed by at least one processor, cause the at least one processor to:
receive, from a merchant system, a single authentication request message configured to authenticate a user of a portable financial device for a plurality of transactions between the user and a plurality of merchants, the single authentication request message comprising (i) an aggregation identifier in one or more fields of the single authentication request message to identify the single authentication request message as an aggregated authentication request message, (ii) a plurality of merchant identifiers, and (iii) transaction data for each transaction of the plurality of transactions;
in response to receiving the single authentication request message, authenticate the user by verifying an identity of the user;
detect the aggregation identifier in the single authentication request message;
in response to detecting the aggregation identifier, generate a single authentication response message comprising a plurality of authentication codes, each authentication code of the plurality of authentication codes corresponding to a merchant of the plurality of merchants and a transaction of the plurality of transactions; and
cause, by transmitting the single authentication response message comprising the plurality of authentication codes to the merchant system, the merchant system to separately process each transaction of the plurality of transactions by:
corresponding each authentication code of the plurality of authentication codes with a transaction of the plurality of transactions; and
for each transaction of the plurality of transactions, generating a separate authorization request message to a transaction processing system to request a transfer of payment from an account of the user to an account of a merchant of the plurality of merchants, wherein the separate authorization request message comprises authentication data based on a corresponding authentication code of the plurality of authentication codes to indicate that each transaction was authenticated by an issuer authentication system.

* * * * *